Nov. 8, 1927.
E. F. W. ALEXANDERSON
1,648,711
HIGH FREQUENCY SIGNALING SYSTEM
Filed Sept. 17, 1921
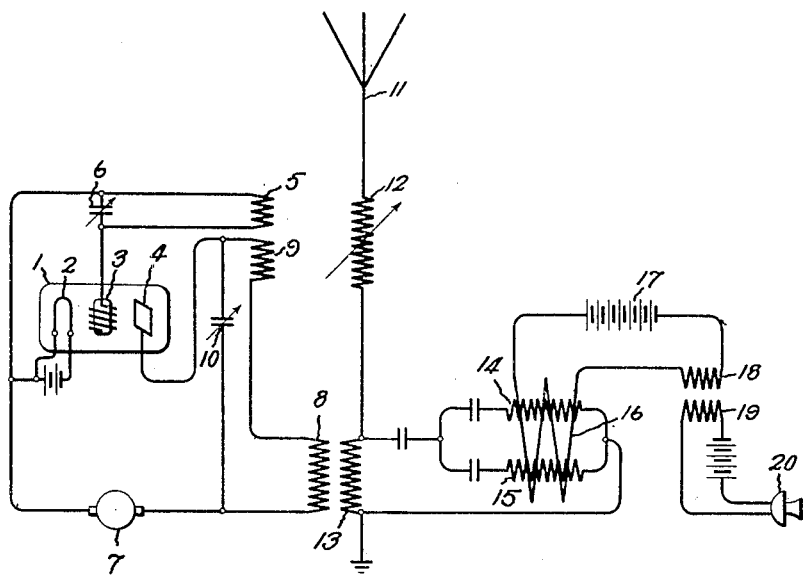
Inventor:
Ernst F. W. Alexanderson,
by
His Attorney.

Patented Nov. 8, 1927.

1,648,711

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

HIGH-FREQUENCY-SIGNALING SYSTEM.

Application filed September 17, 1921. Serial No. 501,355.

My present invention relates to a high frequency signal transmitting system, and more particularly to one employing an oscillation generator of the vacuum tube type for producing hight frequency oscillations for signal transmission.

It has been customary in the past in the operation of vacuum tube oscillation generators for signal transmission to couple the oscillation generator closely to the transmitting circuit and by controlling either the grid or plate potential of the vacuum tube to modulate in accordance with signals to be transmitted the current supplied to the transmitting circuit. One disadvantage of this arrangement has been that the counter-electromotive force developed in the output circuit of the oscillation generator is proportional to the amplitude of the current in the transmitting circuit. If the generating set is to work at maximum efficiency it is necessary that the counter-electromotive force produced in the oscillation circuit should approach as closely as possible at all times the potential of the direct current power supply of the set. With the arrangement previously used, when the modulated current falls to a low value the counter-electromotive force developed in the oscillation circuit also falls to a low value and the set operates at low efficiency. In other words, under these conditions the losses in the tubes themselves increase greatly in proportion to the output. In order to overcome this disadvantage I employ a fairly loose coupling between the vacuum tube oscillation generating set and the antenna, and in order to control the current supplied to the transmitting circuit vary the amount of coupling between the generator and the transmitting circuit in accordance with the signals to be transmitted.

One convenient way in which this may be accomplished is to connect a magnetic amplifier of the general type described in my United States Patent, No. 1,206,643 in shunt to the secondary of the coupling transformer. By supplying to the saturation winding of the magnetic amplifier the signaling current the impedance of the shunt windings will be varied in accordance with the signals to be transmitted and the effective coupling between the generating set and the transmitting circuit will be varied accordingly. When the current supplied to the transmitting circuit falls to a minimum the counter-electromotive force generated in the oscillation circuit of the generating set will, instead of decreasing as in the previous case, increase slightly and approach more closely the potential of the direct current supply. As a result, the set will operate at a high efficiency even when little current is being supplied to the transmitting circuit.

The novel features which I believe to be characteristic of my invention are set forth in the appended claims. My invention itself, however, both as to its organization and method of operation will best be understood by reference to the following description taken in connection with the accompanying drawing in which I have indicated diagrammatically one way in which my invention may be carried into effect.

As indicated in the drawing, the generating set comprises a three-electrode vacuum tube 1 having the usual cathode 2, grid 3 and anode or plate 4. The grid or input circuit of the tube 1 comprises an inductance 5 and variable capacity 6, if desired. The output or plate circuit of the generating set comprises a direct current source of energy 7, the primary 8 of a coupling transformer, a second coupling coil 9 and a variable capacity 10, in shunt to coils 8 and 9. By reason of the coupling between coils 5 and 9 oscillations will be produced in the oscillating circuit made up of coils 8 and 9 and capacity 10 in the well known manner.

The transmitting circuit in the case illustrated comprises an antenna 11 with the usual tuning inductance 12 and the secondary 13 of a coupling transformer which is loosely coupled to the primary coil 8. In shunt to the secondary 13 of the coupling transformer there are connected the high frequency windings 14 and 15 of a magnetic amplifier of the well known type described in my United States patent previously referred to. A signaling current is supplied to the saturation winding 16 of the magnetic amplifier through the local circuit which includes a direct current source of energy 17 and the secondary 18 of a telephone transformer, the primary of which is in a local circuit of the telephone transmitter 20.

In accordance with the well known method of operation of the magnetic amplifier, the effective impedance in shunt to the secondary 13 varies between a high value when the saturation current supplied to winding 16, is small, and a very low value when the saturation current supplied to winding 19 is high. In other words, the effective impedance of the high frequency windings 14 and 15 varies between a value where it has substantially no effect upon the power supplied to the transmitting circuit and a value where it acts substantially as a short circuit to the winding 13 and prevents any appreciable supply of current to the transmitting circuit.

The effect of these variations in the impedance of the high frequency windings 14 and 15 is to vary the degree of coupling between the oscillation generator and the transmitting circuit. When the impedance of the high frequency windings 14 and 15 is very low the coupling between the two circuits is a minimum and substantially no current will be supplied to the transmitting circuit. The counter-electromotive force developed in the oscillating circuit of the oscillation generator will, however, be substantially constant under both conditions of operation merely increasing slightly to a value near that of the voltage of the source 7 when the impedance of the high frequency windings 14 and 15 is low and under either condition the generating equipment will operate at high efficiency and no appreciable portion of the energy withdrawn from the oscillator will be consumed in the modulating apparatus.

While I have shown in a purely diagrammatic manner and described one embodiment of my invention, it will be apparent that my invention is by no means limited to the particular embodiment illustrated, but that many modifications in the form and arrangement of the apparatus used for permitting the oscillating circuit of the generating set to operate at substantially constant potential may be made without departing from the scope of my invention as set forth in the appended claims.

What I claim as new and desire to secure by Letters Patent of the United States, is:

1. The combination in a high frequency signaling system of a transmitting circuit, a vacuum tube oscillator for generating high frequency oscillations, a loose coupling transformer for supplying high frequency oscillations from said oscillator to said transmitting circuit, a magnetic controlling device having windings connected in shunt to the secondary of said transformer, and means for varying the effective impedance of said windings in accordance with signals.

2. The combination in a high frequency signaling system of a transmitting circuit, a vacuum tube oscillator for generating high frequency oscillations, a loose coupling transformer for supplying high frequency oscillations from said oscillator to said transmitting circuit having its primary winding in circuit with said oscillator and its secondary winding in said transmitting circuit, and means for varying in accordance with signals the coupling between said oscillator and said transmitting circuit.

3. The method of operating a signal transmitting system comprising a vacuum tube oscillator and a transmitting circuit, which consists in supplying energy directly from the oscillator to the transmitting circuit and in varying the coupling between the oscillator and the transmitting circuit in accordance with signals to be transmitted, and thereby varying the amount of energy transferred from the oscillator to the transmitting circuit while maintaining substantially constant the electromotive force of the oscillator, and delivering to the transmitting circuit substantially all of the energy withdrawn from the oscillator.

4. The method of operating a signal transmitting system comprising a vacuum tube oscillator and a transmitting circuit, which consists in producing, by means of the oscillator, a substantially constant high frequency electromotive force, supplying directly to the transmitting circuit from the oscillator energy varying in accordance with signals and delivering to the transmitting circuit substantially all of the energy withdrawn from the oscillator.

5. The combination in a high frequency signaling system of a transmitting circuit, a vacuum tube oscillator for generating high frequency oscillations, an oscillation circuit associated therewith, a loose coupling between said oscillation circuit and said transmitting circuit, means acting on said coupling for varying in accordance with signals the amount of energy supplied to said transmitting circuit and at the same time maintaining substantially constant the high frequency electromotive force of said oscillation circuit and consuming in the variable means no substantial portion of the energy withdrawn from the oscillator.

6. The combination of a high frequency signaling system of a transmitting circuit, a vacuum tube oscillator for generating high frequency oscillations, an oscillation circuit associated therewith, a loose coupling between said oscillation circuit and said transmitting circuit, and means acting on said coupling for varying in accordance with signals the amount of energy transferred from the oscillation circuit to said transmitting circuit, said means being so arranged as to consume in the variable means no substantial portion of the energy withdrawn from the oscillator.

7. The combination in a high frequency signaling system of a transmitting circuit, a vacuum tube oscillator for generating high frequency oscillations, the oscillation circuit of said oscillator being directly coupled to said transmitting circuit by a loose coupling, and means connected in shunt to the secondary of said coupling and adapted to vary the degree of coupling furnished thereby in accordance with signals to be transmitted and thereby vary the amount of energy transferred from the oscillation circuit to the transmitting circuit.

In witness whereof I have hereunto set my hand this 16th day of September, 1921.

ERNST F. W. ALEXANDERSON.